United States Patent
Riley et al.

(10) Patent No.: US 8,054,827 B2
(45) Date of Patent: Nov. 8, 2011

(54) PUBLICLY-SWITCHED TELEPHONE NETWORK SIGNALING AT A MEDIA GATEWAY FOR A PACKET-BASED NETWORK

(75) Inventors: Kevin Riley, Tyngsboro, MA (US); Mark Globerson, Sudbury, MA (US); Mark St. Pierre, Groton, MA (US); Joseph Wung, Tewksbury, MA (US)

(73) Assignee: Sonus Network, Inc., Westford, MA (US)

( * ) Notice: Subject to any disclaimer, the term of this patent is extended or adjusted under 35 U.S.C. 154(b) by 250 days.

(21) Appl. No.: 11/447,231

(22) Filed: Jun. 5, 2006

(65) Prior Publication Data

US 2007/0002841 A1  Jan. 4, 2007

Related U.S. Application Data (60) Provisional application No. 60/687,226, filed on Jun. 3, 2005.

(51) Int. Cl.
*H04L 12/66* (2006.01)
*H04L 12/28* (2006.01)

(52) U.S. Cl. ........................ 370/352; 370/389
(58) Field of Classification Search .......... 370/352–356, 370/389, 400, 401
See application file for complete search history.

(56) References Cited

U.S. PATENT DOCUMENTS

| | | | |
|---|---|---|---|
| 6,735,175 B1 * | 5/2004 | Havens | 370/236 |
| 6,873,689 B1 | 3/2005 | Butler et al. | 379/93.05 |
| 6,987,781 B1 | 1/2006 | Miller et al. | |
| 7,142,511 B2 * | 11/2006 | Thune et al. | 370/230.1 |
| 7,672,442 B2 | 3/2010 | Lin et al. | |
| 2001/0049730 A1 | 12/2001 | Brendes et al. | 709/223 |
| 2002/0126678 A1 | 9/2002 | Kelly et al. | 370/401 |
| 2003/0076793 A1 | 4/2003 | Gao | |
| 2003/0076815 A1 * | 4/2003 | Miller et al. | 370/352 |
| 2003/0214971 A1 * | 11/2003 | Sheldon et al. | 370/467 |
| 2003/0231623 A1 * | 12/2003 | Ryu et al. | 370/352 |
| 2005/0063371 A1 * | 3/2005 | Nealon | 370/373 |
| 2005/0105540 A1 * | 5/2005 | Baumann et al. | 370/401 |
| 2005/0259669 A1 | 11/2005 | Ozu | |

(Continued)

FOREIGN PATENT DOCUMENTS

EP  1202530 A2  5/2002

(Continued)

OTHER PUBLICATIONS

Harasaki et al., "Media Gateway Signaling Gateway CX6100-SG," *NEC Res. & Develop.*, vol. 42, No. 2, Apr. 2001, pp. 138-142. XP-001036305.

(Continued)

*Primary Examiner* — Hong Cho
(74) *Attorney, Agent, or Firm* — Proskauer Rose LLP (57) ABSTRACT

Methods, systems, and computer program products are described associated with publicly-switched telephone network ("PSTN") signaling at a media gateway for a packet-based network. The described signaling involves receiving, at a media gateway in communication with a packet-based network, signaling information and content information associated with one or more calls. The signaling information is based on a PSTN standard. At least a portion of both the signaling information and the content information is processed at the media gateway using a common processor. At least a portion of the content information is transmitted to a destination based on at least a portion of the signaling information.

16 Claims, 7 Drawing Sheets

U.S. PATENT DOCUMENTS

| | | | |
|---|---|---|---|
| 2006/0023657 A1* | 2/2006 | Woodson et al. | 370/328 |
| 2006/0023658 A1* | 2/2006 | Phillips et al. | 370/328 |
| 2006/0109837 A1* | 5/2006 | Saha et al. | 370/352 |
| 2007/0002842 A1 | 1/2007 | Wung et al. | 370/352 |

FOREIGN PATENT DOCUMENTS

| | | | |
|---|---|---|---|
| EP | 1309149 A2 | 5/2003 | |
| WO | WO01/49045 A2 | 7/2001 | |

OTHER PUBLICATIONS

International Search Report for PCT/US2006/021880 (6 pgs.).

Anquetil et al., "Media Gateway Control Protocol and Voice Over IP Gateways", Alcatel Telecommunications Review—$2^{nd}$ Quarter 1999; pp. 151-157. XP-00830045.

Namura et al.. "Media Gateway NEAX$\in^{CX}$. CX3100". NEC Res. & Develop., vol. 412. No. 2. Apr. 2001. pp. 128-132. XP-001036303A.

Non-Final Office Action for U.S. Appl. No. 11/447,233, Mailing Date: Oct. 31, 2008.

Non-Final Office Action for U.S. Appl. No. 11/447,233, Mailing Date: Jul. 9, 2009.

Final Office Action for U.S. Appl. No. 11/447,233. Mailing date: Mar. 18, 2010.

Response to Final Office Action and Request for Continued Examination Under 37 C.F.R. §1.114 to the Office Action for U.S. Appl. No. 11/447,233 dated: Jul. 7, 2010.

Amendment and Response to the Office Action for U.S. Appl. No. 11/447,233 dated: Mar. 18, 2009.

Amendment and Response to the Office Action for U.S. Appl. No. 11/447,233 dated: Nov. 9, 2009.

* cited by examiner

PUBLICLY-SWITCHED TELEPHONE NETWORK SIGNALING AT A MEDIA GATEWAY FOR A PACKET-BASED NETWORK

CROSS REFERENCES TO RELATED APPLICATIONS

This application claims the benefit of U.S. Provisional Application No. 60/687,226, filed on Jun. 3, 2005, the disclosure of which is hereby incorporated herein by reference.

TECHNICAL FIELD

The description describes publicly-switched telephone network signaling at a media gateway for a packet-based network.

Acronyms

The description employs various acronyms and terms to refer to various services and system components. The acronyms can be understood with reference to the following definitions:

| Term | Definition |
| --- | --- |
| Signaling System 7 (SS7) | Signaling System 7 (SS7) includes a signaling protocol for performing out-of-band signaling in support of the call-establishment, billing, routing, and information-exchange functions of the public switched telephone network (PSTN). In general, SS7 involves providing signaling data rather than content data, such as voice or multimedia. The signaling data can be routed and switched independently of the content data. As used herein, SS7 refers to a PSTN signaling protocol that is used worldwide. SS7 signaling is used herein interchangeably with PSTN signaling. |
| SS7 Network | A signaling network that employs signaling data for content data transmitted through a PSTN network. |
| Message Transfer Part (MTP) | MTP refers to a portion of a software protocol stack that can provide physical, data link, and network layer functions with respect to an SS7 signaling network. MTP can transport information from the upper layers of an SS7 protocol stack (including the user parts and SS7 applications) across an SS7 network. MTP can include network management procedures to reconfigure message routing in response to network failures. |
| Link Sets | Signaling data links can be grouped into link sets. Links in a link set can connect to a single point code. In some embodiments, up to sixteen (16) links can be assigned to a single link set. Some embodiments feature link sets having more than sixteen links. |
| Point Code | An identifier, typically a number, that identifies a node in an SS7 network. A point code can be used to direct messages to the appropriate destination. Service Control Points (SCP), Signal Transfer Points (STP), and Intelligent Peripherals in the SS7 network can have unique point codes. |
| Signal Transfer Points (STP) | Signal Transfer Points include switches that can relay messages between SS7 network switches and databases. Multiple STPs route SS7 messages to the correct outgoing signaling link, for example, based on SS7 message address fields. |
| Signaling Data Links | Signaling Data Links can be used to connect SS7 signaling points. The links can generally facilitate data transfer at rates between about 48 kilobytes per second and about 64 kilobytes per second The type of signaling data link used can vary by country. |
| Integrated Services Digital Network User Part (ISUP) | The functional part of the SS7 protocol, (e.g., the part of the protocol that specifies the interexchange signaling procedures for the setup and tear down of trunk calls between networks). |
| A-links | Access links. |
| D-links | Diagonal links. |
| E-links | Extended links. |
| F-Links | Fully associated links. |

BACKGROUND

In general, traditional telephone networks, such as the publicly-switched telephone network ("PSTN"), employ circuitry and switches to connect telephone users across the PSTN to facilitate communication. The PSTN employs the International Telecommunication Union standard Common Channel Signaling System # 7 (SS7) for call setup, call routing, and control of other PSTN components for calls worldwide. Networks that employ SS7 signaling protocols are referred to herein as SS7 networks.

An emerging alternative to traditional phone networks uses packetized data to transmit content of telephone communications (e.g., voice or videoconferencing data) through data networks, such as packet-based networks and/or broadband networks. Data networks employ data transfer protocols such as Internet Protocol (IP) to support voice, data, and multimedia (e.g., video) content. Transmitting telephone communications over the Internet is commonly referred to as a Voice over Internet Protocol (VOIP). Transmitting telephone communications over other broadband networks can be referred to as Voice Over Broadband (VOBB). A packet-based telephone network employs packet-switches (also referred to herein as gateways, media gateways, media gateway controllers, switching components, softswitches, data sources, or call processors). A packet assembler can convert a signal received from a traditional telephone network call into a set of data packets for transmission through the IP network.

Figure 1:
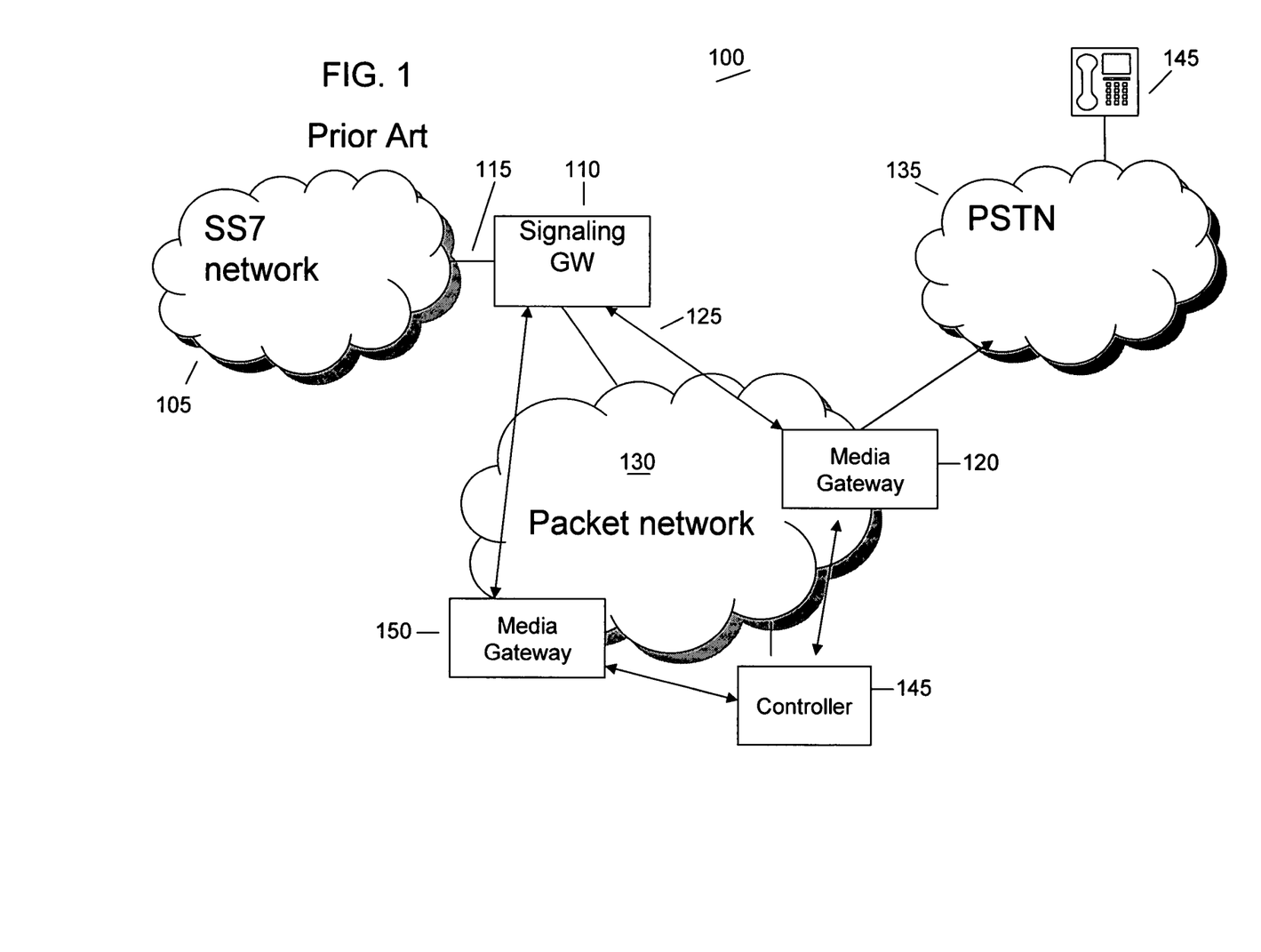
FIG. 1 is a known architecture for interfacing a PSTN to a packet-based network.

Routing telephone calls over a data network involves interfacing the PSTN to the data network. FIG. 1 is a known architecture developed by Sonus Networks, Inc. for interfacing the PSTN to a data network. FIG. 1 depicts a system 100 that includes a signaling network 105 that provides PSTN signaling, for example, SS7 signaling, that is associated with a particular telephone call. The SS7 signaling includes out-of-band messages and instructions for routing the content of the phone call that is received from a first PSTN (not shown). The first PSTN is associated with the signaling network 105 and can include the signaling network 105. The signaling network 105 communicates with a signaling gateway 110 over a communication path 115. The communication path 115 can be, for example, a time-division multiplexed path for providing signaling information and/or the call content to the signaling gateway 110. One example of a signaling gateway is a SGX, sold by Sonus Networks Inc.

The signaling gateway 110 determines where to transmit the call content based on the signaling information. The signaling gateway 110 is in communication with a media gateway 120 over a communication link 125 through a packet-based network 130. One example of a media gateway is a GSX9000, sold by Sonus Networks Inc. The call content is provided to the media gateway 120 by the first PSTN. The signaling gateway 110 transmits packet-based signaling with the call content to the media gateway 120. The packet-based signaling is used to route the call content through the packet-based network 130 to the media gateway 120 and allows the media gateway 120 to transmit the call content to the PSTN 135. The media gateway 120 also provides PSTN signaling to the PSTN 135 to allow the PSTN 135 to deliver the call content to the appropriate telephone 140.

The system 100 also includes a controller 145 in communication with the media gateway 120 and other media gateways (e.g., the media gateway 150). One example of a controller is a PSX, sold by Sonus Networks Inc. The controller 145 provides routing and policy information to the media gateway 120 for processing the call content and packet-based signaling information. Congestion or a high-volume of call traffic that occurs on either the SS7 network 105 or on the packet-based network 130 can affect call quality (e.g., the number or rate of dropped calls or echo effects).

Figure 2:
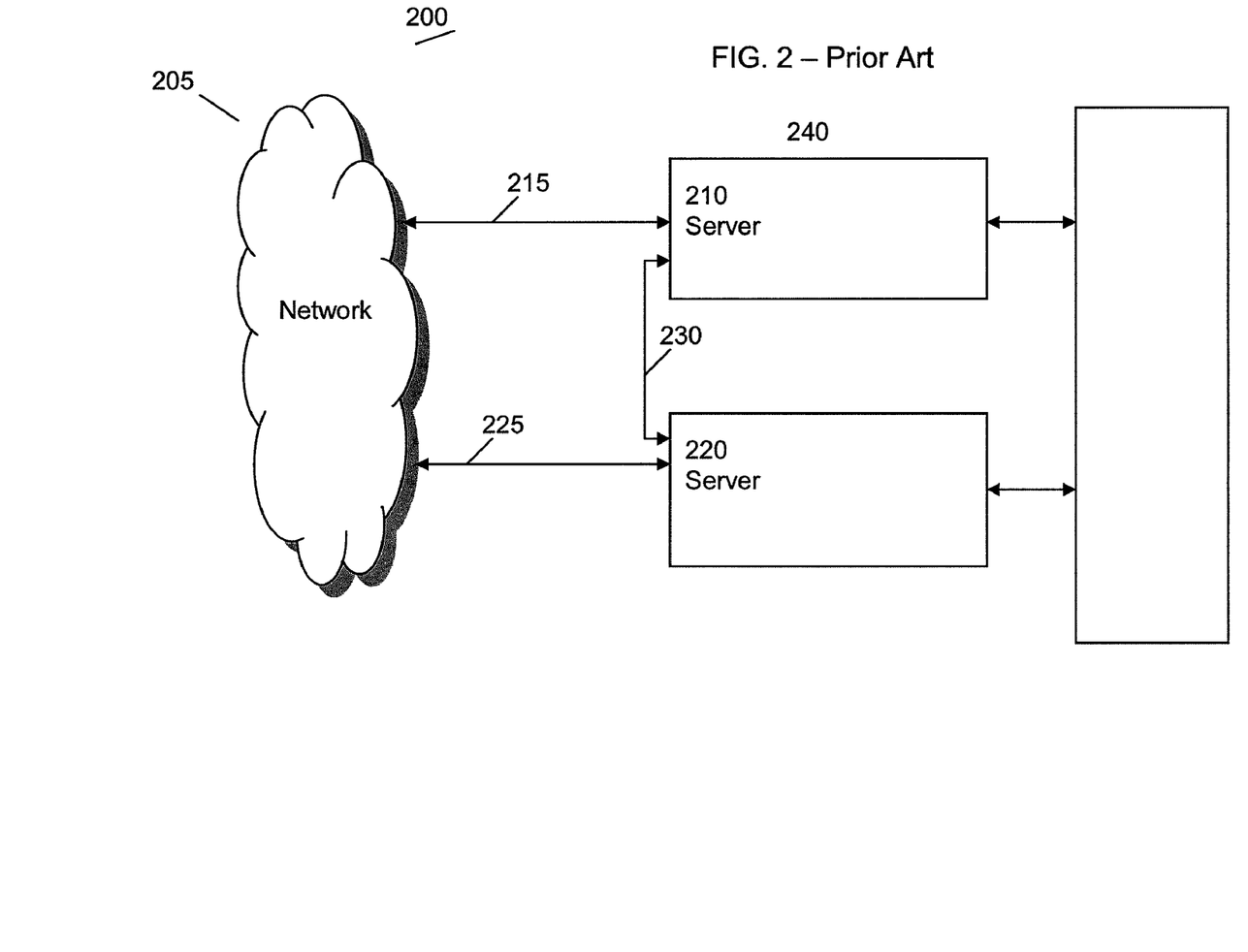
FIG. 2 is a block diagram of a known configuration for providing redundancy in telephone networks.

FIG. 2 is a block diagram of a known configuration for providing redundancy in telephone networks. The system 200 includes a signaling network 205 that communicates with a first server 210 over a first communication path 215 (e.g., a TDM signaling link). The signaling network 205 also communicates with a second server 220 over a second communication path 225. The first server 210 communicates with a second server 220 over an inter-server communication path 230.

The first server 210 and the second server 220 are logically associated with a switch 240. The inter-server communication path 230 facilitates load-sharing between the first server 210 and the second server 220. The first server 210 and the second server 220 each handle about one-half of all calls that are handled by the switch 240. In some embodiments, the first server 210 represents a first computing element CE0 to a packet-based network (not shown), and the second server 220 represents a second computing element CE1 to the packet-based network.

If the first server 210 fails, the capacity of the switch 240 to process calls is reduced by about one-half. Similarly, if the second server 220 fails, the capacity of the switch 240 to process is reduced by about one-half. Moreover, upgrading the software of either the first server 210 or the second server 220 involves taking the particular server out of service. As a result, the number of calls processed by the switch 240 is reduced by about one-half.

SUMMARY

The description describes a system in which signaling functionality is implemented on a media gateway. Implementing signaling functionality on a media gateway is advantageous because the communication path through a packet-based network between the signaling gateway and the media gateway (e.g., the communication path 125 of FIG. 1) is eliminated. As such, congestion of the packet-based network does not substantially impact the operation of the signaling or the media gateway functionalities. Effects of call congestion arise from congestion in the SS7 network, not the packet-based network. Moreover, the media gateway need not register the network addresses of signaling gateways.

Implementing signaling functionality and signaling termination on a media gateway allows signaling information to use some of the same processing capabilities that are used in the media gateway, which reduces the number of processors required for processing telephone calls. Fewer processors permit a reduction in possible failure points in the packet-based network and reduces the cost of equipment required to operate the network. Moreover, signaling information can be processed by one or more general purpose digital signal processors used by the media gateway instead of a specialized processor. The general purpose digital signal processor can also communicate with a general purpose processor that processes content data. As used herein, "digital signal processor" is a term used as a matter of convenience, and does not refer to any particular digital signal processor.

In addition, performing signal termination operations at the media gateway allow for redundancy of all telephone calls processed by the media gateway. Previous systems have implemented a load-sharing architecture between two computing elements serving a media gateway. In such an architecture, if one computing element fails, signaling and/or call capacity of the media gateway is reduced by one-half. In the configuration described herein, all of the calls that are processed by the media gateway are maintained on two servers within the media gateway, and the signaling and call data is synchronized between the two servers. If one of the servers fails, the other server can process data for all calls so signaling capacity is not automatically reduced by one-half. The description describes a configuration that allows all signaling and call data to be maintained on both servers.

The invention, in one aspect, features a method. The method involves receiving, at a media gateway in communication with a packet-based network, signaling information and content information associated with one or more calls. The signaling information is based on a publicly-switched telephone network ("PSTN") standard. The method involves processing, at the media gateway, at least a portion of the signaling information and at least a portion of the content information using a common processor. The method involves transmitting at least a portion of the content information to a destination based on at least a portion of the signaling information.

In another aspect, the invention features a system for processing one or more calls in a packet-based network. The system includes a media gateway module in communication with the packet-based network to receive signaling information and content information associated with the one or more calls. The signaling information is based on a PSTN standard. The media gateway module can transit at least a portion of the content information to a destination based on at least a portion of the signaling information. The system includes a common processor module logically associated with the media gateway module to process at least a portion of the signaling information and at least a portion of the content information.

The invention, in yet another aspect, includes a computer program product tangibly embodied in an information carrier. The computer program product includes instructions operable to cause data processing apparatus in communication with a packet-based network to receive at a media gateway in communication with the packet-based network signaling information and content information associated with one or more calls. The signaling information is based on a PSTN standard. The computer program product also includes instructions operable to cause the data processing apparatus to process, at the media gateway, at least a portion of the signaling information and at least a portion of the content information using a common processor and to transmit at least a portion of the content information to a destination based on at least a portion of the signaling information.

In other examples, any of the aspects above can include one or more of the following features. In some embodiments, additional signaling information is transmitted with the content information. Additional signaling information can be based on a signaling protocol that is different than the protocol of the signaling information received at the media gateway. Examples of the different signaling protocol includes at least one of an SS7 protocol, an integrated services digital network protocol, a channel associated signaling protocol, a session initiation ("SIP") protocol, a SIP-T protocol, an H.323 protocol, or any combination of these.

In some embodiments, the common processor is a digital signal processor. The digital signal processor can be a general purpose digital signal processor. Processing in the media gateway can include processing in the common processor other gateway functions. Such functions can include filtering functions, filling functions, retransmission of data functions, error-handling functions, error-rate monitoring functions, data alignment functions, or any combination of these.

In some embodiments, processing includes, processing, at the media gateway, at least a portion of the signaling information associated with MTP2 level functions. The MTP2 level functions can include filtering functions, filling functions, retransmission of data functions, error-handling functions, error-rate monitoring functions, data alignment functions, or any combination of these. Some embodiments involve selecting, at the media gateway, one or more communication paths for the signaling information, the content information or both. For example, selecting one or more communication paths can involve extracting data about a signaling link, and selecting a communication channel over which to transmit the signaling information and the content information. Some embodiments involve selecting a port of the media gateway to receive the signaling information, wherein the port that is selected is based on a configurable software routine.

In some embodiments, the common processor module processes the content information in a network layer of an Open Systems Interconnections ("OSI") protocol stack, and a sub-processor module processes the signaling information in a data link layer of the OSI protocol stack. The sub-processor module can process the signaling information on a digital signal processor. In some embodiments, the common processor module and the sub-processor module process the content information and the signaling information in a Signaling System #7 ("SS7") protocol stack. The sub-processor module can process the signaling information in an MTP2 layer of the SS7 protocol stack.

Some embodiments feature a sub-processor module logically associated with the common processor module to process at least a portion of the signaling information, and the common processor module and the sub-processor module perform functions on a general purpose digital signal processor. In some embodiments, the media gateway module and the common processor module are associated with one network address or the same point code. The signaling gateway module can be part of a media gateway.

In some embodiments, the signaling information, content information, or both are received by the media gateway module over an A-type link, a D-type link, an E-type link, an F-type link, or any combination thereof. Some embodiments feature a network interface in communication with the media gateway module, the common processor module, or both. The network interface can include an interface to the publicly-switched telephone network or the packet-based network. The network interface can include an E-1 interface, a T-1 interface, an E1/T1 interface, a DS0 interface, a DS1 interface, a DS3 interface, an STM-0 interface, an STM-1 interface, or any combination thereof.

One implementation of the invention can provide all of the above advantages.

The details of one or more examples are set forth in the accompanying drawings and the description below. Further features, aspects, and advantages of the invention will become apparent from the description, the drawings, and the claims.

DETAILED DESCRIPTION

Figure 3:
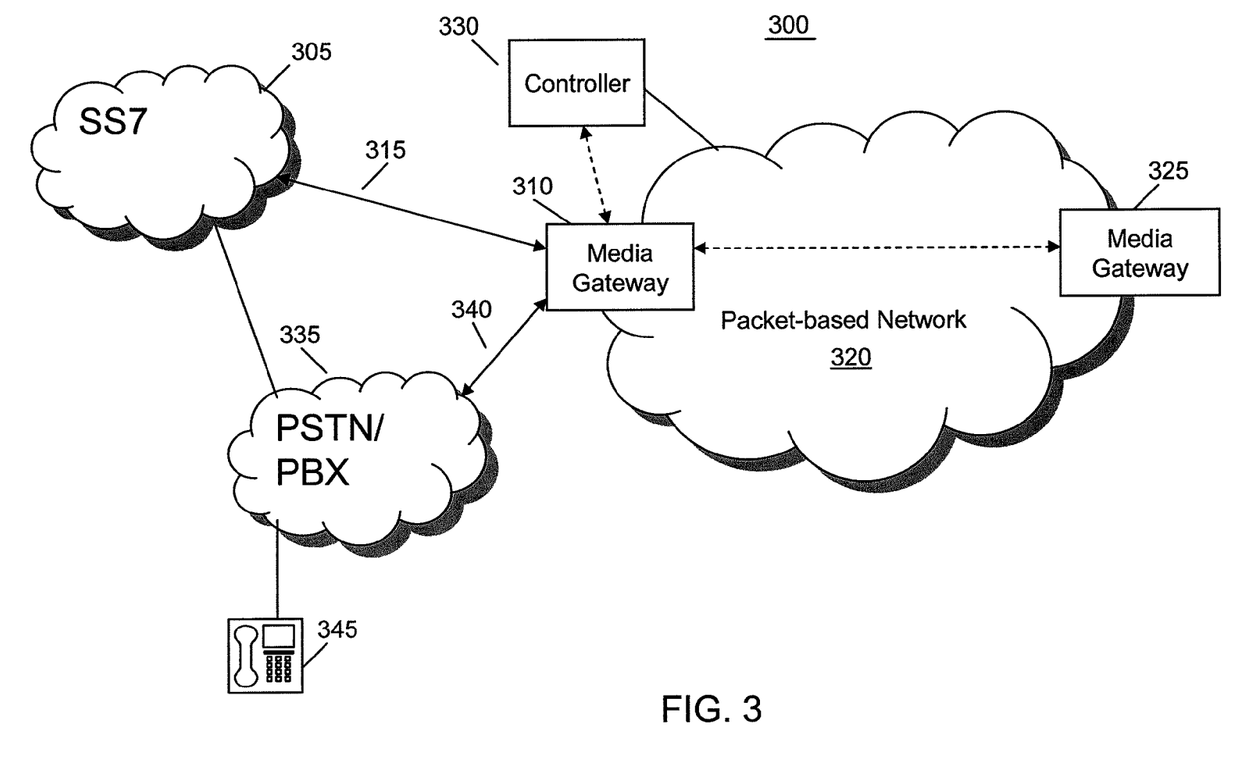
FIG. 3 is block diagram illustrating an exemplary configuration for call processing according to an embodiment of the invention.

FIG. 3 is block diagram illustrating an exemplary configuration for call processing according to an embodiment of the invention. The system 300 of FIG. 3 includes an SS7 network 305 that is in communication with a media gateway 310 over a communication path 315. The SS7 network 305 is associated with a first PSTN (not shown, but can be included with the network 305) and provides SS7 signaling for calls to and from the first PSTN network. The media gateway 310 is in communication with a packet-based network 325 and a second media gateway 325 over the packet-based network 320. The media gateway 310 includes a module (not shown) for processing SS7 signaling messages from the SS7 network 305. In some embodiments, the media gateway 310 terminates the SS7 messages (e.g., does not retransmit the SS7 messages over the packet-based network 320). The media gateway 310 can transmit additional signaling information with the content information over the packet-based network 320.

In some embodiments, the system 300 can include a controller 330 in communication with the media gateway 310 and the packet-based network 320. The controller 330 provides additional control functions to the media gateway 310 for processing of content information and signaling information from the SS7 network 305. The media gateway 310 is in communication with a second network 335 over a communication path 340. The second network 335 can be a PSTN, a private branch exchange, a point of presence, packet-based network, or other type of network for transmitting the content information to the intended 345. The recipient 345 can be, for example, a telephone, fax machine, or a computer.

The system 300 does not include a communication path between a signaling gateway and the media gateway 305. More specifically, the system 300 eliminates the need for the communication path 125 through the network 130 of FIG. 1.

In some embodiments, the communication path 315 contains multiple channels for carrying data. The communication path can include one or more signaling links from the SS7 network 305. The signaling links can include A-links, D-links, E-links, or F-links carrying data according to a standardized network protocol.

In general, A-links refer to Access Links, and A-links generally connect a service switching point (SSP) and a service transfer point (STP) in the SS7 network 305. A-links can also connect a service control point (SCP) and an STP in the SS7 network 305. D-links generally refer to diagonal links used in a hierarchical network that connect an STP at a primary hierarchical level to an STP at a secondary STP hierarchical level. E-links generally connect remote pairs of STP to an SSP, to provide an alternate communication path for signaling information when the portions of the SS7 network 305 are congested. F-links are generally used between two SSPs in the SS7 network 305 to carry a relatively large volume of signaling information. In some embodiments, F-links permit access to databases in the SS7 network 305, for example, for billing information.

In some embodiments, the A-links, D-links, E-links, and F-links are connected to the media gateway 310 via various physical or circuit interfaces, for example, E1, T1, E1/T1, DS0, DS1, DS3, synchronous optical network (SONET), STM-0, STM-1, or other interfaces capable of accepting content and signaling data. In some embodiments, data is received at rates in excess of 48 kilobytes-per-second.

In some embodiments, multiple voice trunks and/or multiple signaling links are carried by the communication path 315. A trunk is a channel (generally physical, but can also be logical) for carrying a group of telephone calls that can include content and signaling data. For example, in some telephony networks in some countries, both the signaling and the bearer information are carried in the same channel. The media gateway 310 is adapted to extract and separate the content data from the signaling data after media gateway 310 receives the data. The media gateway 310 can include a module that allows a user (e.g., a network operator) to specify a signaling link or channel on which data is carried. This functionality can be referred to as "grooming."

Performing grooming internally (e.g., at the media gateway 310) enables the particular data (e.g., signaling or content data) to be transmitted to the appropriate module within the media gateway 310 more accurately and/or efficiently. More specifically, the content data is not separated from the signaling data outside of the media gateway 310. Grooming can thus be performed at the media gateway 310 rather than remotely by, for example, the signaling gateway 110 of FIG. 1 or by another external grooming module. Grooming by the system 300 reduces data flow to the media gateway 310. Additionally, grooming can be performed on data received by the media gateway 310 from the SS7 network 305 or data to be transmitted by the media gateway 310 (e.g., to the media gateway 325 or the PSTN 335). In some embodiments, grooming is controlled via a software application, and the software application can be user-configurable.

In some embodiments, the media gateway 310 transmits content information with additional signaling information. For example, when the media gateway 310 transmits content information to the media gateway 325, the additional signaling information can include signaling information based on packet-based signaling protocols. Examples of packet-based signaling protocols include session initiation protocol (SIP), a SIP-T protocol, an H.323 signaling protocol, a non-standardized gateway-to-gateway protocol, or any combination thereof. In some embodiments, the additional signaling information can be based on other signaling protocols, for example, an SS7 protocol, an integrated services digital network protocol, or a channel associated signaling protocol.

The media gateway 310 can perform other gateway functions on the content information. For example, the media gateway 310 can perform data filtering functions or filling functions to improve the quality of the call. Other gateway functions include retransmission of data that failed to transmit and aligning data for proper transmission. In some embodiments, the media gateway 310 performs error-checking functions such as error-monitoring, error-rate handling or general error-handling of data within the media gateway 310.

The media gateway 310 can perform processing functions on the content data according to any of a number of standardized protocols or codecs, such as G.711, G.723, G.726, G.729, T.38, RFC2833, or any combination thereof.

In some embodiments, the media gateway 310 performs facility associated signaling (FAS) to allow a signaling channel and a content channel (also called a bearer channel) to be processed by the same facility (e.g., the media gateway 310) as the signaling data. An example of a suitable media gateway 310 for use in the system 300 of FIG. 3 is the GSX400™ sold by Sonus Networks, Inc. of Chelmsford, Mass.

In some embodiments, the media gateway 310 is employed in relatively large packet-based networks 320 that are interfaced to relatively small points of presence (not shown). Such a configuration is called the hub-and-spoke model. Additional modules can be distributed throughout the system 300 or interfaced to the packet-based network 320 to optimize processing. Examples of such modules include provisioning servers, packet-based switches or routers, softswitches, or database modules.

Figure 4:
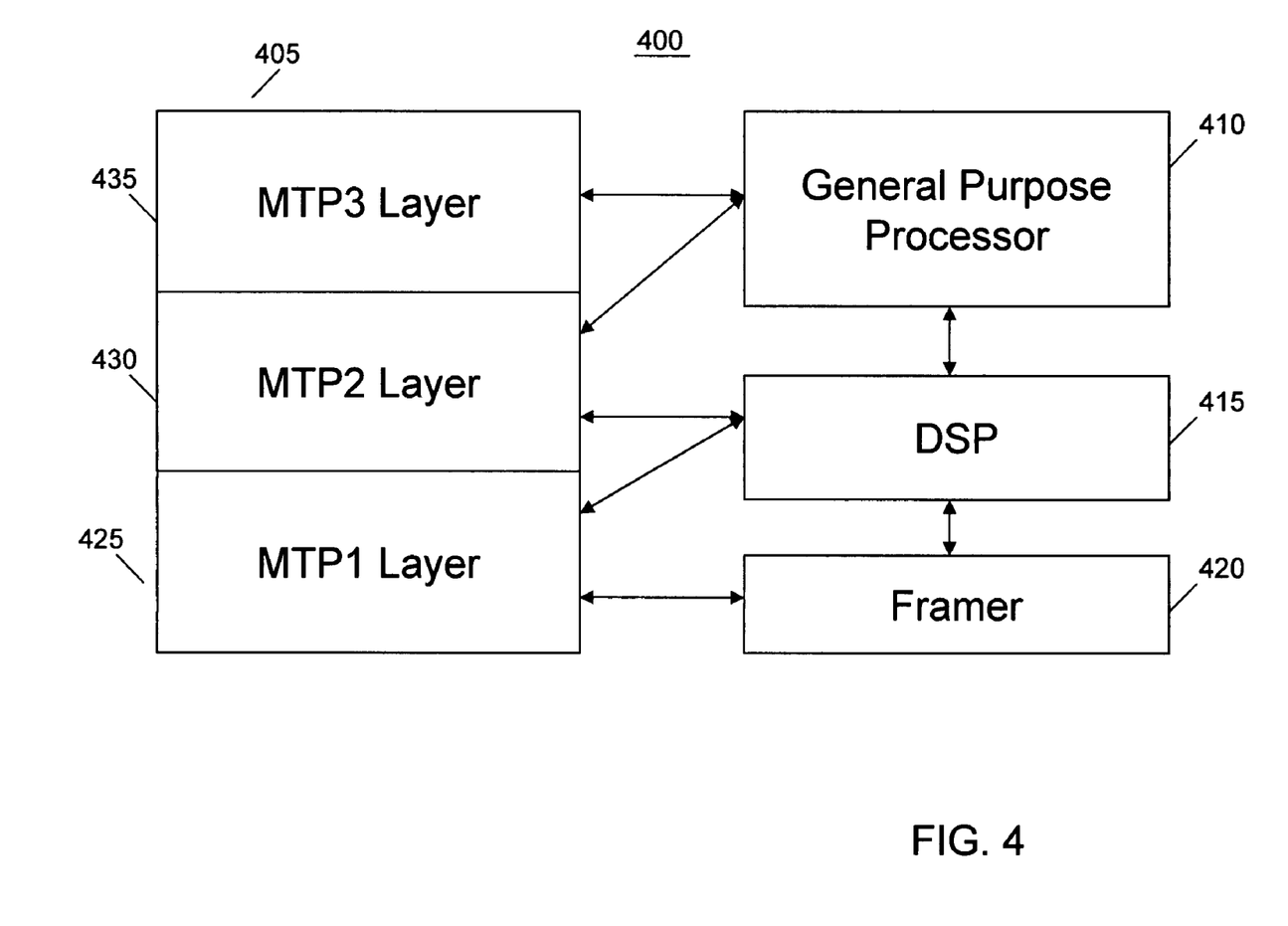
FIG. 4 is a functional diagram illustrating the relationship between a protocol stack and modules for implementing call processing.

FIG. 4 is a functional diagram illustrating the relationship between a protocol stack and modules for implementing call processing. The system 400 includes a protocol stack 405, a general purpose processor module 410, a digital signal processing (DSP) module 415, and a framer module 420. In some embodiments, the general purpose processor module 410, the DSP module 415, and the framer module 420 are implemented on the same circuit board or chip (not shown), but this is not required. In some embodiments, the system 400 is implemented on a media gateway (e.g., the media gateway 310 of FIG. 3) that processes both content and signaling data in a common processing environment.

The digital signal processing module 415 is sometimes referred to as a sub-processor, sub-processor module or DSP. The DSP module 415 is a general purpose module that is used for processing SS7 signaling messages in the system 400. The DSP module 415 can also be used for other data processing functions not related to SS7 signaling, for example, other processing functions performed by the media gateway 310 of FIG. 3 as discussed above. Advantageously, the system 400 is scalable. In some embodiments, the system 400 is independently scalable. The number of links (e.g., F-links) and quantity of signaling information that is processed increase as additional DSP modules (not shown) are added to the system 400. The additional DSP modules communicate and can be controlled by the general purpose processor module 410, and generally do not require additional general purpose processor modules (not shown). Such an implementation can realize a cost savings because the DSP module 415 generally is less costly than the general purpose processor module 310. Scalability can also be realized because the DSP module 415 can be programmed generally for any functions, signaling, call processing, and others, and is more flexible than a special purpose processor module that has a specific purpose, such as a Communications Processor Module (CPM).

The protocol stack 405 includes a first layer 425 processed by the framer module 420 and the DSP module 415. The framer module 420 is used for assembling, disassembling and framing data packets associated with content data and signaling data. Data from the data packets is used for processing in higher layers in the protocol stack 405. The first layer 425 is analogous to the lower levels of the Physical Layer of the Open Systems Interconnection (OSI) protocol stack. For example, the first layer 425 is associated with the physical connection or interface to the SS7 network 305 of or the packet-based network 320 FIG. 3. In some embodiments, the first layer 425 is included in the Message Transfer Part 1 (MTP1) Layer of an SS7 stack. The first layer 425 (e.g., the layer processed by the DSP 415) includes functions for processing SS7 signaling messages.

The protocol stack 405 includes a second layer 440 processed by the DSP module 415 and the general purpose processor module 410. The second layer 430 also communicates with the first layer 425 and the third layer 435 of the protocol stack. The second layer 430 is analogous to the Data Link Layer of the OSI protocol stack. In some embodiments, the second layer 430 is a Message Transfer Part 2 (MTP2) layer. An MTP2 layer is capable of detecting and correcting errors in the data that is received by the MTP1 layer (e.g., the first layer 425). The MTP2 layer can also provide additional functions such as cyclic redundancy checking, data delimitation, data alignment, data initial alignment, data error monitoring, data filtering, data retransmission, or flow control. The data is sometimes referred to as a signaling unit. Signaling units vary and contain data related to various information associated with a telephone call.

The DSP module 415 processes the upper portions of the first layer 425 and the lower portions of the second layer 430. The system 400 features faster error processing in the DSP module 415, which results in higher data processing efficiency by the system 400.

The protocol stack 405 includes a third layer 435 processed by the general purpose processor module 410. The third layer 435 also communicates directly with the second layer 430 and passes messages to the first layer 425 via the second layer 430. The third layer is analogous to the Network Layer of the OSI protocol stack. In some embodiments, the third layer 435 is a Message Transfer Part 3 (MTP3) layer. The MTP3 Layer 420 provides data including routing instructions between the media gateway (e.g., the media gateway 210) and other network devices. In addition, the MTP3 Layer 420 can reroute data traffic away from failed or congested communication paths (not shown). In some embodiments, the MTP3 Layer 420 controls data flow in the protocol stack 405.

The third layer 435 is capable of communicating with higher layers (not shown) in the protocol stack 405 (e.g., layers analogous to the Transport, Session, Presentation, and Application Layers of the OSI protocol stack). The third layer 435 performs functions such as routing and distribution messages, including content information and signaling information.

The general purpose processor module 410 communicates with the upper portions of the second layer 430 and the third layer 435, analogous to communicating with the upper portions of the Data Link Layer of the OSI protocol stack and the Network layer of the OSI protocol stack.

The system 400 features processor-intensive processing of data (e.g., below the third layer 435) occurring on the DSP module 415. Such a configuration allows signaling information to be processed and terminated in the same system 400 that processes content information (e.g., the combination of the general purpose processor module 410 and the DSP module 415). In some embodiments, the protocol stack 405 is portable. An example of a protocol stack 405 that can be used or modified for use in the system 400 is an SS7 Stack sold by Flextronics Software Systems, Inc. of Gurgaon, Haryana, India.

The system 400 allows serialization of more than one gateway, for example, by including timing and clock functionality such as building integrated timing service (BITS) clocking functionality or according to a Telcordia Network Building Systems standard (NEBS). In some embodiments, the system 400 is used with a server such as a field-replaceable server to allow "plug-and-play" functionality.

Figure 5:
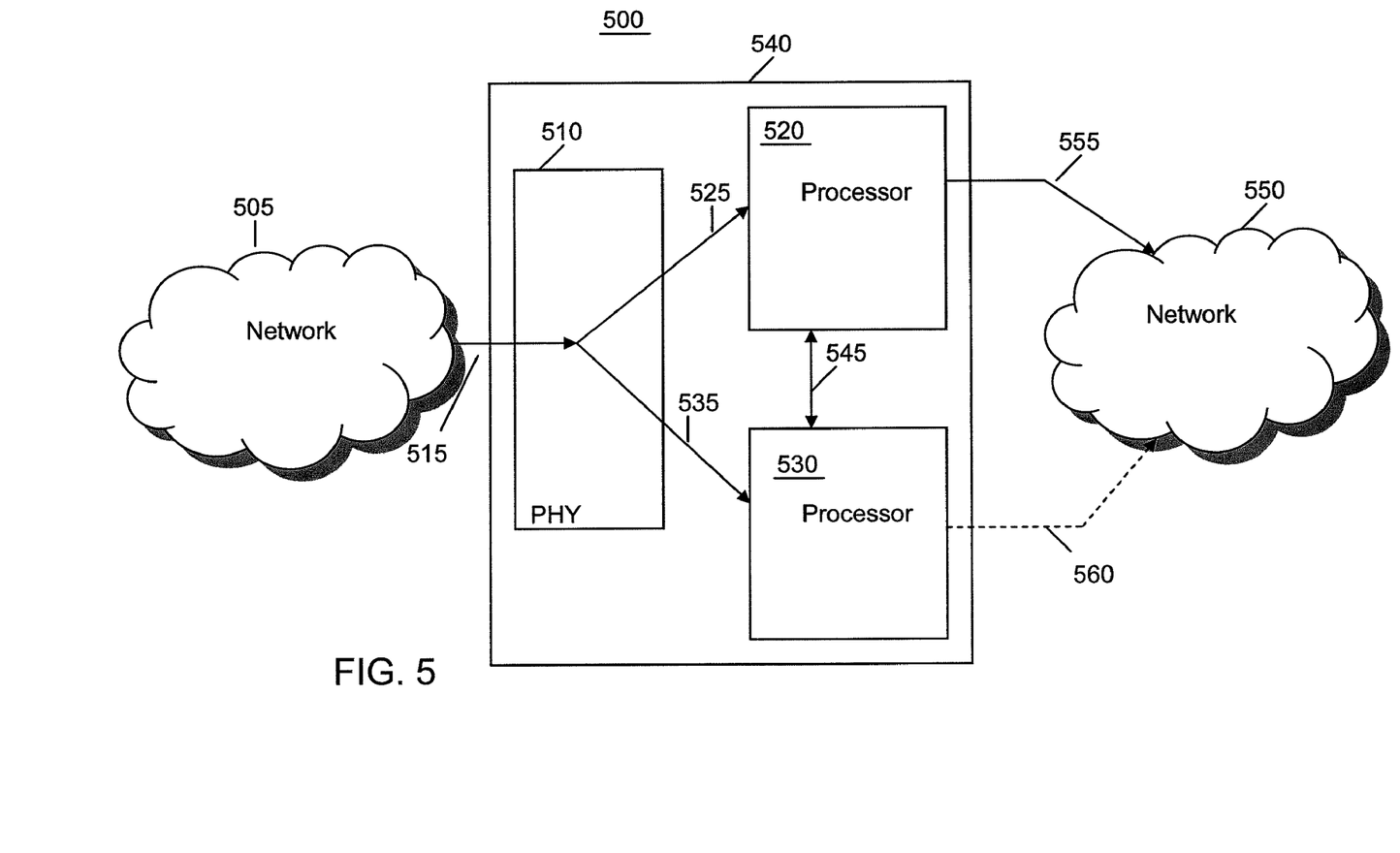
FIG. 5 is a block diagram of an exemplary configuration for implementing redundancy in a telephone network according to an embodiment of the invention.

FIG. 5 is a block diagram of an exemplary configuration for implementing redundancy in a telephone network according to an embodiment of the invention. The system 500 includes a first network 505 that provides content and/or signaling information to a receiver module 510 over a communication path 515. The receiver module 510 processes, for example, the PHY layer of the SS7 protocol stack. The receiver module 510 communicates with a first processor module 520 via a first communication path 525. The receiver module 510 communicates with a second processor module 530 via a second communication path 535.

The first processor module 520 and the second processor module 530 are logically associated with a media gateway module 540. The first processor module 520 and the second processor module 530 can both be associated with a single network address (e.g., a single DNS number or single point code). In some embodiments, the first processor module 520 and the second processor module 530 are not associated with the same media gateway (e.g., different DNS numbers or different point codes). The first processor module 520 is in communication with the second processor module 530 via a synchronization communication path 545. In general, the modules 520 and 530 are located in the media gateway 540, although this is not required as long as they can synchronize with each other. In some embodiments, the receiver module 510 is logically associated with the media gateway module 540.

The first processor module 520 can communicate with a second network 550 over the active communication path 555. The second processor module 530 is in communication with the second network 550 over a standby communication path 560. The standby communication path 560 does not actively communicate (e.g., transmit and receive data) with the second network 550 while the active communication path 555 is communicating with the second network 550.

The receiver module 510 receives signaling information from the first network 505. The receiver module 510 transmits the signaling information to both the first processor module 520 and the second processor module 530. Both the first processor module 520 and the second processor module 530 can process the entire load of data that is provided by the receiving module 510 (e.g., call load is not shared). The second processor module 530 is adapted to receive the data from the receiver module 510, but the second processor module 530 does not process content data or transmit the signaling data while the first processor module 520 processes content data or transmits the content or signaling data.

In some embodiments, each of the first processor module 520 and the second processor module 530 include the system 300 of FIG. 3 for processing data associated with a phone call. In such embodiments, each of the first processor module 520 and the second processor module 530 include a framer module (not shown) and a DSP module (not shown). The framer module and the DSP module of both the first processor module 520 and the second processor module 530 operate to process the signaling data received from the receiver module.

The data processed by the framer modules and the DSP modules are synchronized over the synchronization communication path 545. Synchronizing the signaling data as the data is processed in parallel enables to the system to operate redundantly. For example, data about the state of various signaling links (not shown) in the communication path 515 (e.g., link state data), call state information, and sequence or sequence number information about the data received by the receiver module 510 can be synchronized. The data in the first processor module 520 is processed independently or asynchronously of data in the second processor module 530. More specifically, the results of the data processed in the second processor module 530 do not affect the result of data processed in the first processor module 520 until synchronization occurs.

More specifically, when the first processor module 520 fails or is taken out of service (sometimes called switchover), the second processor module 530 handles all of the call data processed by the media gateway module 540 without substantially reducing processing capacity. The call capacity of the second processor module 530 does not decrease in the absence of the first processor module 520. When the first processor module 520 fails, the failure does not substantially affect processing of SS7 signaling of the Integrated Services Digital Network (ISDN) User Part (ISUP) of the system 300 of FIG. 3. The ISUP is a protocol layer that handles functional aspects of call control such as set-up and tear-down of trunk circuits for carrying calls.

In some embodiments, the data that is synchronized is known as critical data. Critical data can include data related to configuration of any or all of the following: the point code of the first processor module 520 or the second processor module 530, the communication path 515, configured signaling links on the communication path 515, configured routes through the first network 505 or the second network 550, registered user data, or other data that can be used in data redundancy or real-time data recovery.

In some embodiments, the data is synchronized in the second layer 330 (e.g., the MTP2 layer) of the protocol stack 305 of FIG. 3. This configuration allows the media gateway module 540 to provide redundancy at the signaling-link-level, sometimes called N-for-1 redundancy because redundancy is enabled for all links, on a per-link basis, as the links are related to the media gateway. Known systems (e.g., the system 200 of FIG. 2) provide 1-for-1 redundancy at the media gateway-level (e.g., the media gateway 240) rather than at the individual link level. In some embodiments, the data is synchronized in the third layer 335 (e.g., the MTP3 layer) of the protocol stack 305 of FIG. 3.

Figure 6:
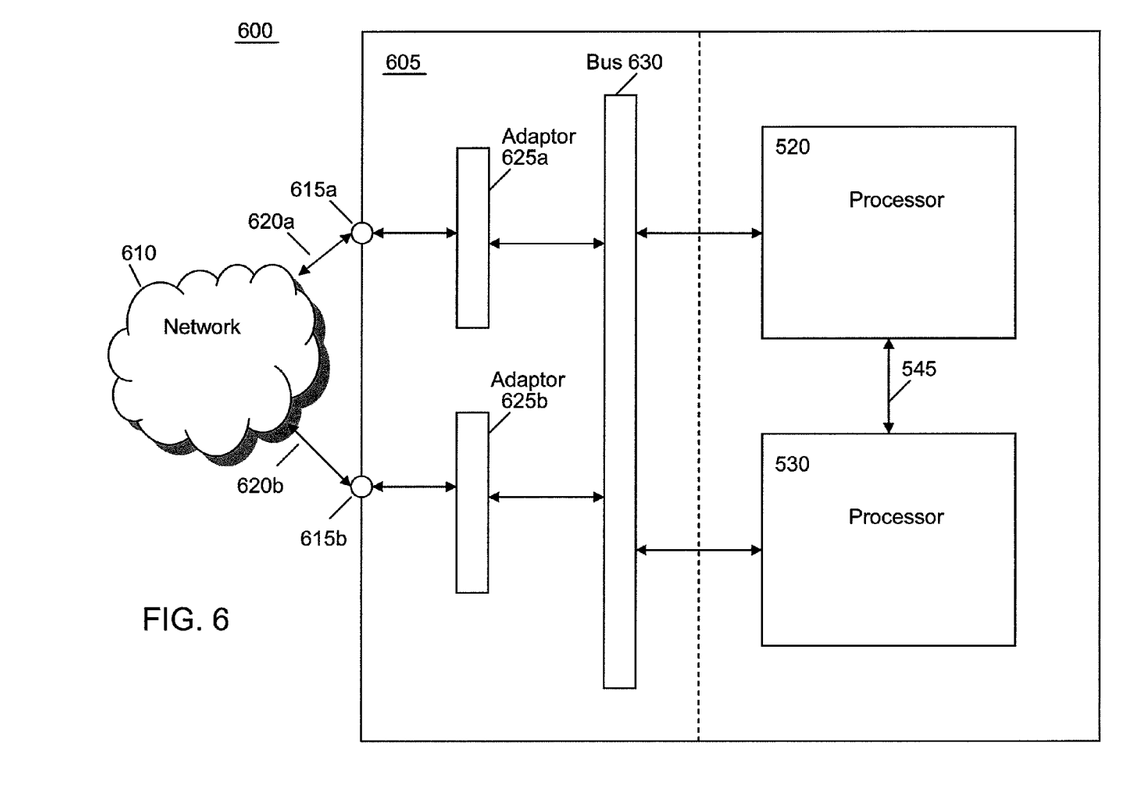
FIG. 6 is a block diagram of a media gateway for providing redundancy in call processing.

FIG. 6 is a block diagram of a media gateway for providing redundancy in call processing. The system 600 includes a media gateway 605 in communication with a signaling network 610. The media gateway 605 includes the first processor module 520 and the second processor module 530 of FIG. 5 in communication using the synchronization communication path 545. The media gateway 605 includes two ports 615a & 615b. The ports 615a & 615b are adapted to communicate with the network 610 over communication paths 620a & 620b, respectively. The communication paths 620a & 620b can be circuits or signaling links for carrying signaling information. In such embodiments, the ports 615a & 615b can be E1/T1 circuit interfaces for communicating with the network 605 (e.g., a SS7 signaling network). Each of the ports 615a & 615b can receive information from the network 610. For example, each of the ports 615a & 615b can receive twelve signaling links. In some embodiments, the signaling links form a link set received by the media gateway 605. In this way, the media gateway 605 can be used to interface to multiple networks like network 610.

The ports 615a & 615b are in communication with two adaptor modules 625a & 625b respectively. The adaptor modules 625a & 625b can be used, for example, in the receiver module 510 of FIG. 5. The adaptor modules 625a & 625b are in communication with a communications bus 630. The communications bus 630 can provide data to either the first processor module 520, the second processor module 530, or both. The communications bus 630 is also referred to as a redundancy plane. The communications bus 630 can use a standard bus protocol or a gateway-specific or proprietary protocol.

The communications bus 630 facilitates redundant processing of data received at the port 615a. More specifically, after the data is received by the port 615a, the data is transmitted to the adaptor module 625a for subsequent processing. The adaptor module 625a provides the data to the communications bus 630, which provides the data to each of the first processor module 520 and the second processor module 530. Similar data flow occurs for data received at the second portion 615b. Using this architecture, the signals from the port 615a and/or the port 615b can be processed by either of the modules 520 and 530.

Figure 7:
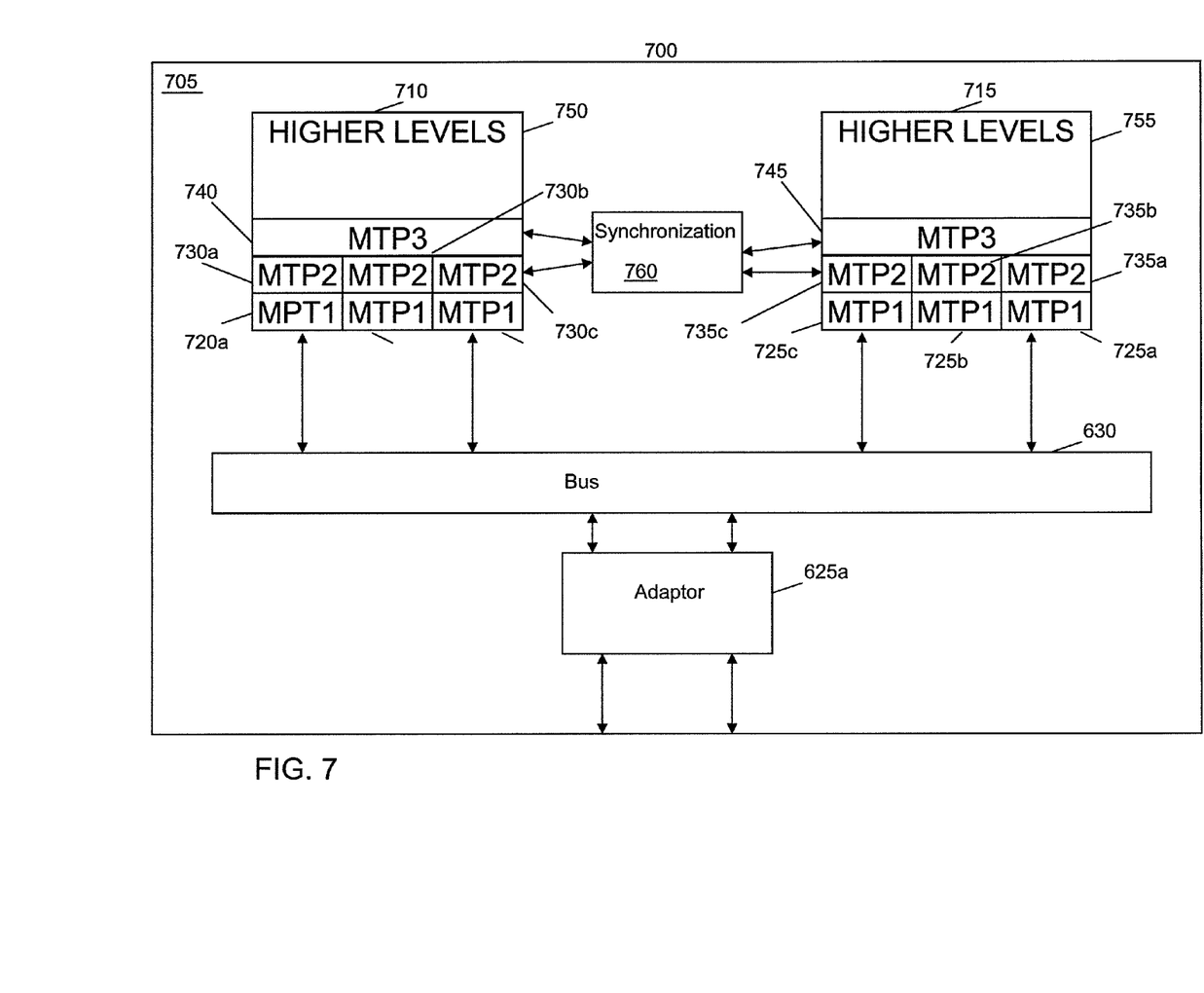
FIG. 7 is a functional diagram illustrating processing functions for providing redundancy.

FIG. 7 is a functional diagram illustrating processing functions for providing redundancy. The system 700 includes a media gateway 705 that has a first protocol stack 710 associated with a first processor module (not shown) and a second protocol stack 715 associated with a second processor module (not shown). The media gateway 705 includes the first adaptor module 625a and the communications bus 630 of FIG. 6 to illustrate an exemplary flow of data.

Signaling data is communicated from the communications bus 630 to an MTP1 layer 720a of the first protocol stack 710 and an MTP1 layer 725a of the second protocol stack 715 for processing as discussed above in FIG. 3. Each of the MTP1 layers 720a, 725a communicate with a respective DSP (not shown) for asynchronously processing the data. The first protocol stack 710 includes multiple MTP1 layers 720a, 720b, & 720c (collectively 720) to communicate with multiple DSPs (not shown) for processing signaling data for a plurality of calls. Similarly, the second protocol stack 715 includes multiple MTP1 layers 725a, 725b, & 725c (collectively 725) to communicate with multiple DSPs (not shown) asynchronously from the first protocol stack 710.

Each of the MTP1 layers 720a, 720b, & 720c in the first protocol stack 710 communicates with a corresponding MTP2 layer 730a, 730b, & 730c (collectively 730) for performing processing functions on the signaling and/or content information. Each of the MTP1 layers 725a, 725b, & 725c in the second protocol stack 715 communicates with a corresponding MTP layer 735a, 735b, & 735c (collectively 735) for performing processing functions asynchronously. All of the MTP2 layers 730 in the first protocol stack 710 communicate with an MTP3 layer 740. All of the MTP2 layers 735 in the second protocol stack 715 communicate with an MTP3 layer 745. The MTP3 layer 740 in the first protocol stack 710 communicates with higher levels 750 (e.g., the application-oriented and service-oriented levels) in the first protocol stack 710. The MTP3 layer 745 in the second protocol stack 715 communicates with higher levels 755 in the second protocol stack 715. Processing in each of the protocol stacks 710, 715 is performed as discussed above.

Data being processed by the first protocol stack 710 is synchronized with data processed by the second protocol stack 715. More specifically, data from the MTP2 layer 730 of the first protocol stack 710 is synchronized with data from the MTP2 layer 735 of the second protocol stack 715. Generally, the MTP3 layer 745 of the second protocol stack 715 is not active and is thus not synchronized while the first protocol stack 710 (e.g., the first processor module 520 of FIG. 5) is processing data. When the second protocol stack 715 (e.g., the second processor module 530 of FIG. 5) is used or needed to process the signaling data, the MTP3 layer 745 is activated to perform other media gateway functions as discussed above.

In some embodiments, data is synchronized using a synchronization module 760. The synchronization module 760 is also referred to as a control block or a data structure. The synchronization module 760 can be used to synchronize data for each SS7 link in a communication path (e.g., the communication path 515 of FIG. 5) for an entire link set. The data structure 760 can include the following information for each SS7 link or the link set in a communication path:

a. whether the particular link is active
b. an identifier for the link
c. identifiers for the channels within the link
d. the status of the link
e. finite-state-machine (FSM) status including flags
f. FSM sub-states
g. an MTP2 Layer identifier,
h. whether the receiving link or signaling unit is correct
i. transmission queues or variables associated with receiving and transmitting modules
j. number of status indicators "out-of-service" (SIOS) sent
k. data traffic parameters
l. processor outage state.

In some embodiments, the synchronization module 760 is an application-programming interface (API) for performing functions used in data synchronization. The synchronization module 760 can, for example, initialize the synchronization process. The synchronization module 760 can receive data from the protocol stacks 710, 715, reconcile the data, and update incorrect data based on the reconciliation. The synchronization module 760 can also determine that data is to be processed by the second protocol stack 715 and facilitate the processing for example, by activating the MTP3 layer 745 in the second protocol stack 715.

Although the examples set out above employ SS7 as the PSTN standard used for signaling, any other international PSTN standards can be employed, including without limitation, those associated with the International Telecommunications Union ("ITU") Telecommunication Standardization Sector ("ITU-T") (including ITU-T Chinese), American National Standards Institute ("ANSI"), Bell Communications Research ("Bellcore"), Canadian Standards Association ("CSA"), International Organization for Standardization ("ISO"), the European Telecommunications Standards Institute ("ETSI"), or Japan NTC or TTC.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/ or a Web browser through which a user can interact with an example implementation, or any combination of such backend, middleware, or front-end components.

The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method comprising:
   receiving, at a media gateway in communication with a packet-based network, signaling information and content information associated with one or more calls, the signaling information being based on a publicly-switched telephone network ("PSTN") standard and including a first portion associated with a lower portion of a MTP2 layer and a second portion associated with an upper portion of the MTP2 layer;
   processing, at the media gateway using a common processor that includes a digital signal processor module in communication with a general-purpose processor module, i) the first portion of the signaling information associated with the lower portion of the MTP2 layer using the digital signal processor module and ii) the second portion of the signaling information associated with the upper portion of the MTP2 layer using the general-purpose processor module;
   terminating, at the media gateway, the signaling information without forwarding the signaling information to a destination; and
   transmitting, by the media gateway, the content information to the destination based on the signaling information.

2. The method of claim 1, wherein the signaling information further includes a third portion associated with a MTP3 layer that is processed by the general-purpose processor module.

3. The method of claim 2, wherein the MTP3 layer controls routing and distribution of at least a portion of the signaling information.

4. The method of claim 1, wherein the MTP2 layer comprises filtering functions, filling functions, retransmission of data functions, error-handling functions, error-rate monitoring functions, data alignment functions, or any combination thereof.

5. The method of claim 1, wherein the general-purpose processor module processes the second portion of the signaling information associated with the upper portion of the MTP2 layer in a network layer of an Open Systems Interconnections ("OSI") protocol stack, and the digital signal processor module processes the first portion of the signaling information associated with the lower portion of the MTP2 layer in a data link layer of the OSI protocol stack.

6. The method of claim 1, further comprising selecting a port of the media gateway to receive the signaling information, wherein the port that is selected is based on a configurable software routine.

7. The method of claim 1 wherein the digital signal processor module is configured to process a processor-intensive portion of the MTP2 layer, thereby freeing capacity in the general purpose processor module to process more calls.

8. A system for processing one or more calls in a packet-based network, the system comprising:
   a media gateway module in communication with the packet-based network to: i) receive signaling information and content information associated with the one or more calls, the signaling information being based on a PSTN standard and including a first portion associated with a lower portion of a MTP2 layer and a second portion associated with an upper portion of the MTP2 layer, ii) terminate the signal information without forwarding the signaling information to a destination, and iii) transmit the content information to the destination based on the signaling information; and
   a common processor module logically associated with the media gateway module including:
      a digital signal processor module to process the first portion of the signaling information associated with the lower portion of the MTP2 layer and;
      a general-purpose processor module in communication with the digital signal processor module to process the second portion of the signaling information associated with the upper portion of the MTP2 layer.

9. The system of claim 8, wherein the general-purpose processor module processes the second portion of the signaling information associated with the upper portion of the MTP2 layer in a network layer of an Open Systems Interconnections ("OSI") protocol stack, and the digital signal processor module processes the first portion of the signaling information associated with the lower portion of the MTP2 layer in a data link layer of the OSI protocol stack.

10. The system of claim 8, wherein the media gateway module and common processor module are associated with one network address.

11. The system of claim 8, wherein the media gateway module and the common processor module are associated with the same point code.

12. The system of claim 8, wherein the media gateway module is part of a media gateway.

13. The system of claim 8, wherein the signaling information, the content information or both are received by the media gateway module over an A-type link, a D-type link, an E-type link, an F-type link, or any combination thereof.

14. The system of claim 8, further comprising a network interface in communication with the media gateway module, the common processor module, or both, the network interface including an interface to the publicly-switched telephone network or the packet-based network.

15. The system of claim 14, wherein the network interface comprises an E-1 interface, a T-1 interface, a E1/T1 interface, a DS0 interface, a DS1 interface, a DS3 interface, an STM-0 interface, an STM-1 interface, or any combination thereof.

16. A computer program product, tangibly embodied in a computer-readable storage medium, the computer program product including instructions being operable to cause data processing apparatus in communication with a packet-based network to:

receive, at a media gateway in communication with a packet-based network, signaling information and content information associated with one or more calls, the signaling information being based on a publicly-switched telephone network ("PSTN") standard and including a first portion associated with a lower portion of a MTP2 layer and a second portion associated with an upper portion of the MTP2 layer;

process, at the media gateway using a common processor that includes a digital signal processor module in communication with a general-purpose processor module, i) the first portion of the signaling information associated with the lower portion of the MTP2 layer using the digital signal processor module and ii) the second portion of the signaling information associated with the upper portion of the MTP2 layer using the general-purpose processor module;

terminate, at the media gateway, the signaling information without forwarding the signaling information to a destination; and     transmit, by the media gateway, the content information to the destination based on the signaling information.

\* \* \* \* \*